United States Patent [19]
Durham et al.

[11] Patent Number: 5,964,866
[45] Date of Patent: Oct. 12, 1999

[54] ELASTIC SELF-TIMED INTERFACE FOR DATA FLOW ELEMENTS EMBODIED AS SELECTIVE BYPASS OF STAGES IN AN ASYNCHRONOUS MICROPROCESSOR PIPELINE

[75] Inventors: Christopher McCall Durham; Peter Juergen Klim, both of Austin, Tex.

[73] Assignee: International Business Machines Corporation, Armonk, N.Y.

[21] Appl. No.: 08/740,049

[22] Filed: Oct. 24, 1996

[51] Int. Cl.$^6$ ................................. G06F 9/00; G06F 1/04
[52] U.S. Cl. ............................. 712/200; 712/23; 712/25; 712/218; 712/232; 708/521
[58] Field of Search .................. 395/800.23, 800.25, 395/573, 394, 376, 551; 364/736.05; 708/521; 713/400

[56] References Cited

U.S. PATENT DOCUMENTS

| | | | |
|---|---|---|---|
| 4,907,187 | 3/1990 | Terada et al. | 712/201 |
| 5,148,529 | 9/1992 | Ueda et al. | 712/218 |
| 5,280,597 | 1/1994 | Takata et al. | 711/169 |
| 5,386,585 | 1/1995 | Traylor | 710/127 |
| 5,513,132 | 4/1996 | Williams | 708/200 |
| 5,553,276 | 9/1996 | Dean | 364/269 |
| 5,572,690 | 11/1996 | Molnar et al. | 712/200 |
| 5,732,233 | 3/1998 | Klim et al. | 712/200 |
| 5,737,614 | 4/1998 | Durham et al. | 713/322 |
| 5,752,070 | 5/1998 | Martin et al. | 712/33 |
| 5,794,019 | 8/1998 | Genduso et al. | 708/521 |
| 5,835,790 | 11/1998 | Nagai et al. | 710/61 |
| 5,887,129 | 3/1999 | Day et al. | 714/34 |

OTHER PUBLICATIONS

Farnsworth, Craig. "Low Power Implementations of an I2C–Bus I/O Expander", master's thesis presented to the University of Manchester, United Kingdom, pp. 1–126, Aug. 1994.

[PAVE94] Paver, Nigel C., "The Design of an Asynchronous Microprocessor". A thesis presented at the University of Manchester, United Kingdon (pp. 1–11, 17–36, 57–83, and 111–130), Jun. 1994.

[FARN94] Farnsworth, C. "Low Power Implementations of an 12 C–Bus Expander". A Master's thesis presented to the University of Manchester, Manchester, United Kingdom (abstract only). Located at http://www.cs.man.ac.uk., Dec. 1994.

Anonymous, "Dynamic Pipelined Skip Stage Unit", International Business Machines Technical Disclosure Bulletin, vol. 34, No. 7A, pp. 102–103, Dec. 1991.

Anonymous, "Phase Selector and Synchronizer for Two Phase Clock Circuits", International Businessness Machines Technical Disclosure Bulletin, vol. 25, No. 11A, Apr. 1983.

Faxcimilie transmission from Janet Wallwore of University of Manchester, p. 1, Aug. 1998.

Franklin et al., "Clocked and Asynchronous Instruction Pipelines", Proceedings on the 26th International Symposium on Microarchitecture, pp. 177–184, Dec. 1993.

(List continued on next page.)

*Primary Examiner*—Mark R. Powell
*Assistant Examiner*—Jeffrey Allen Rossi
*Attorney, Agent, or Firm*—Anthony V.S. England

[57] ABSTRACT

The invention relates to a processor having a data flow unit for processing data in a plurality of steps. In one version, the data flow unit includes a plurality of consecutive stages which include logic for performing steps of the data processing, the stages being coupled together by a data path, at least one stage being coupled to a transceiver which causes data to be provided to the stage for processing or to bypass the stage unprocessed in response to a stage enable signal; a synchronizer which receives processed data from the stages and causes the processed data to be provided to external logic in synchronization with a clock signal.

12 Claims, 7 Drawing Sheets

OTHER PUBLICATIONS

[PAVE94] Paver, Nigel C. The Design and Implimentation of Asynchronous Microprocessor. A thesis presented to the University of Manchester, Manchester, United Kingdom. (pp. 1–11, 17–36, 57–83, & 111–130). Available at http://www.cs.man.ac.uk/amulet/publicatio, 1994.

[FARN94] Farnsworth, C. "Low Power Implimentations of an 12C–Bus Expander," A Master's thesis presented to the University of Manchester, Manchester, United Kingdon. (abstract only) Available at http://www.cs.man.ac.uk/amulet/publications/thesis/, 1994.

Morton, Shannon V. et al. "ECSTAC: A Fast Asynchronous Microprocessor." Los Alimos: IEEE Computer Society Press. Presented at the Second Working Conference on Asynchronous Design Methodologies, May 31, 1995.

[ENDE96] Endecott, Philipp Brian. "SCALP: A Superscalar Asynchronous Low Power Processor." A Master's thesis presented to the University of Manchester, Manchester, United Kingdom. (pp. 1–7, 10, 69–86) Available at http://www.cs.man.ac.uk/amulet/publications, Jun. 10, 1996.

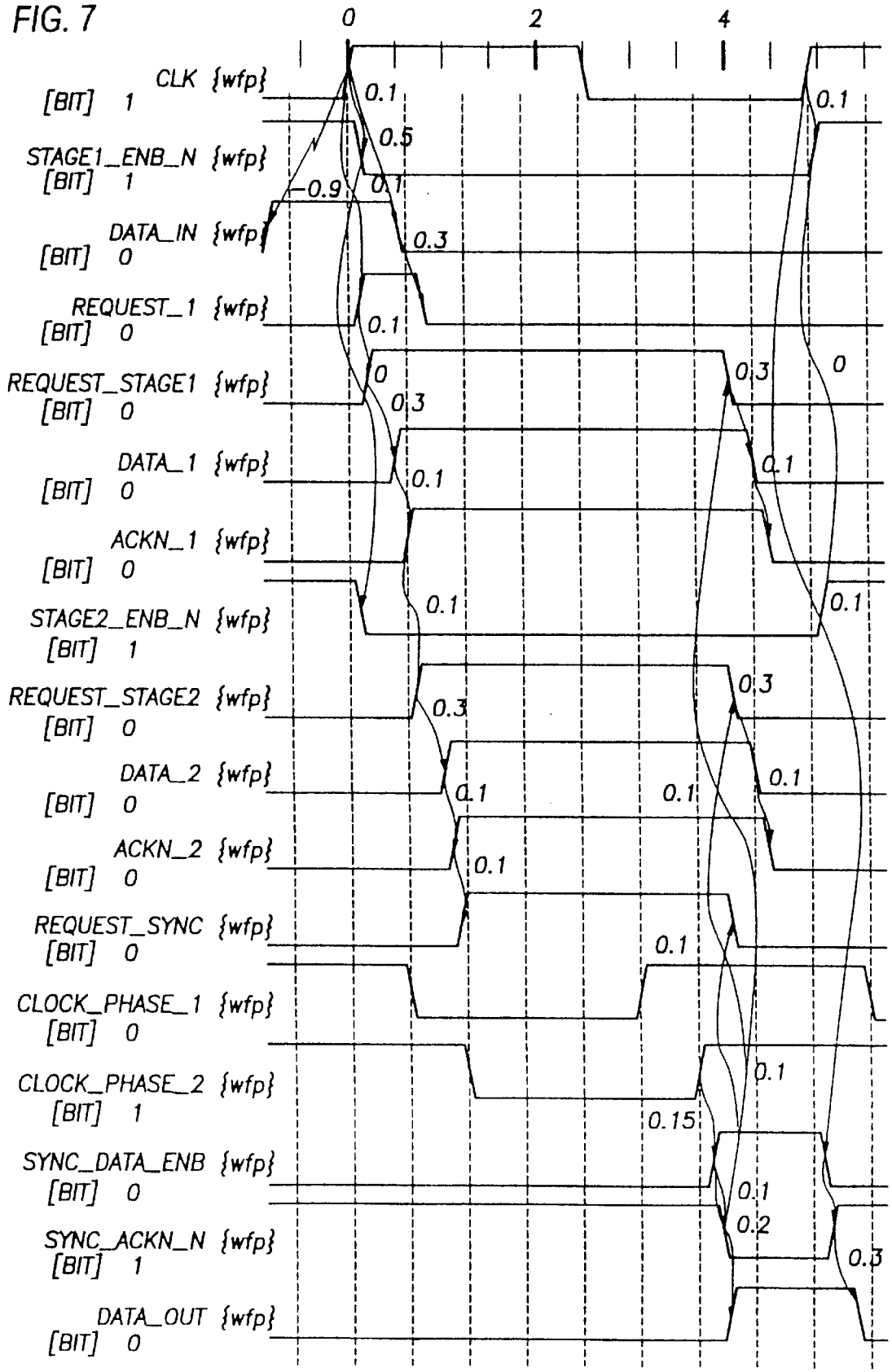

ELASTIC SELF-TIMED INTERFACE FOR DATA FLOW ELEMENTS EMBODIED AS SELECTIVE BYPASS OF STAGES IN AN ASYNCHRONOUS MICROPROCESSOR PIPELINE

TECHNICAL FIELD

This patent application relates in general to the field of microprocessor architecture, and more particularly, to a method and apparatus useful in pipelined data flow structures.

BACKGROUND OF THE INVENTION

Current microprocessors typically include a large number of data flow structures, examples include functional units for executing various types of instructions. Certain types of instructions, such as floating point instructions, require several processing steps to execute. Thus, each data flow structure typically comprises a number of individual stages, each of which is designed to perform one of the processing steps required to executed the instruction. Typically, each stage performs its operation in one clock cycle. Thus, if a data flow structure comprises four stages, then it will require four clock cycles to execute an entire instruction.

In order to increase the throughput of the data flow structure, pipelining techniques are used to allow the data flow structure to execute more than one instruction at a time. Specifically, the data flow structure is designed so that with each clock cycle, data required to execute a new instruction is passed to the first stage, while data from the previous instruction is simultaneously passed from the first stage to the second stage. A similar operation is performed for the remaining stages, so that with each clock cycle, data from one instruction is being passed into the data flow structure while processed data from a prior instruction is being passed from the data flow structure to other resources on the microprocessor.

While pipelining significantly increases throughput, conventional data flow structures still suffer from several drawbacks which limit their overall speed. For example, conventional data flow structures are designed with a fixed number of stages. Instruction data must be processed through each stage before it is output onto the data bus. Not all instructions, however, actually require processing by each stage in the structure for proper execution. For example, in a typical fused multiply-add floating point instruction unit, such as that used in the exemplary IBM POWER PC architecture, there are four stages, i.e., the multiply stage, the shift stage, the add stage and the normalization/round stage. For some instructions, such as multiply or divide, processing by all four stages is required. However, for simple floating point additions, only the add and normalization stages are required. Nevertheless, because the number of stages is fixed, execution of an add instruction still requires four clock cycles.

Another drawback to conventional data flow structures is that each stage requires a clock cycle to process data because the stages only operate on clock cycle intervals. However, different bit patterns of data require different amounts of time to actually process. Some "best case" bit patterns process in much less time than a clock cycle. But because of the synchronous operation of the stages, the data flow structure is unable to take advantage of these advantageous data patterns.

Accordingly, it is an object of the present invention to overcome the above described problems and to provide further improvements and advantages which will become apparent in view of the following disclosure.

SUMMARY OF THE INVENTION

One aspect of the invention relates to a processor having a data flow unit for processing data in a plurality of steps. In one embodiment, the data flow unit comprises a plurality of consecutive stages which include logic for performing steps of the data processing, the stages being coupled together by a data path, at least one stage being coupled to a transceiver which causes data to be provided to the stage for processing or to bypass the stage unprocessed in response to a stage enable signal; a synchronizer which receives processed data from the stages and causes the processed data to be provided to external logic in synchronization with a clock signal.

Another aspect of the invention relates to a data flow unit useful in processing data in a microprocessor, the processing being performed in a plurality of steps, individual steps being performed by stages of the data flow unit. In one embodiment, the data flow unit comprises means for providing data to be processed to an initial stage of the data flow unit; means for providing a request signal to the initial stage of the data flow unit; means for selecting individual stages to process the data; means for, after the selected individual stages have processed the data, passing the processed data to a synchronizer which synchronizes the processed data with a clock signal.

Still a further aspect of the invention relates to a method for processing data in a data flow unit of a microprocessor, the processing being performed in a plurality of steps, individual steps being performed by stages of the data flow unit. In one embodiment, the method comprises providing data to be processed to an initial stage of the data flow unit; providing a request signal to the initial stage of the data flow unit; providing stage enable signals to the stages of the data flow unit to select individual stages to process the data; after the selected individual stages have processed the data, passing the processed data to a synchronizer which synchronizes the processed data with a clock signal.

BRIEF DESCRIPTION OF THE DRAWINGS

FIG. 7 is a timing diagram illustrating the operation of the circuit shown in FIG. 2, according to an embodiment of the invention.

DETAILED DESCRIPTION OF EMBODIMENT OF THE INVENTION

Figure 1:
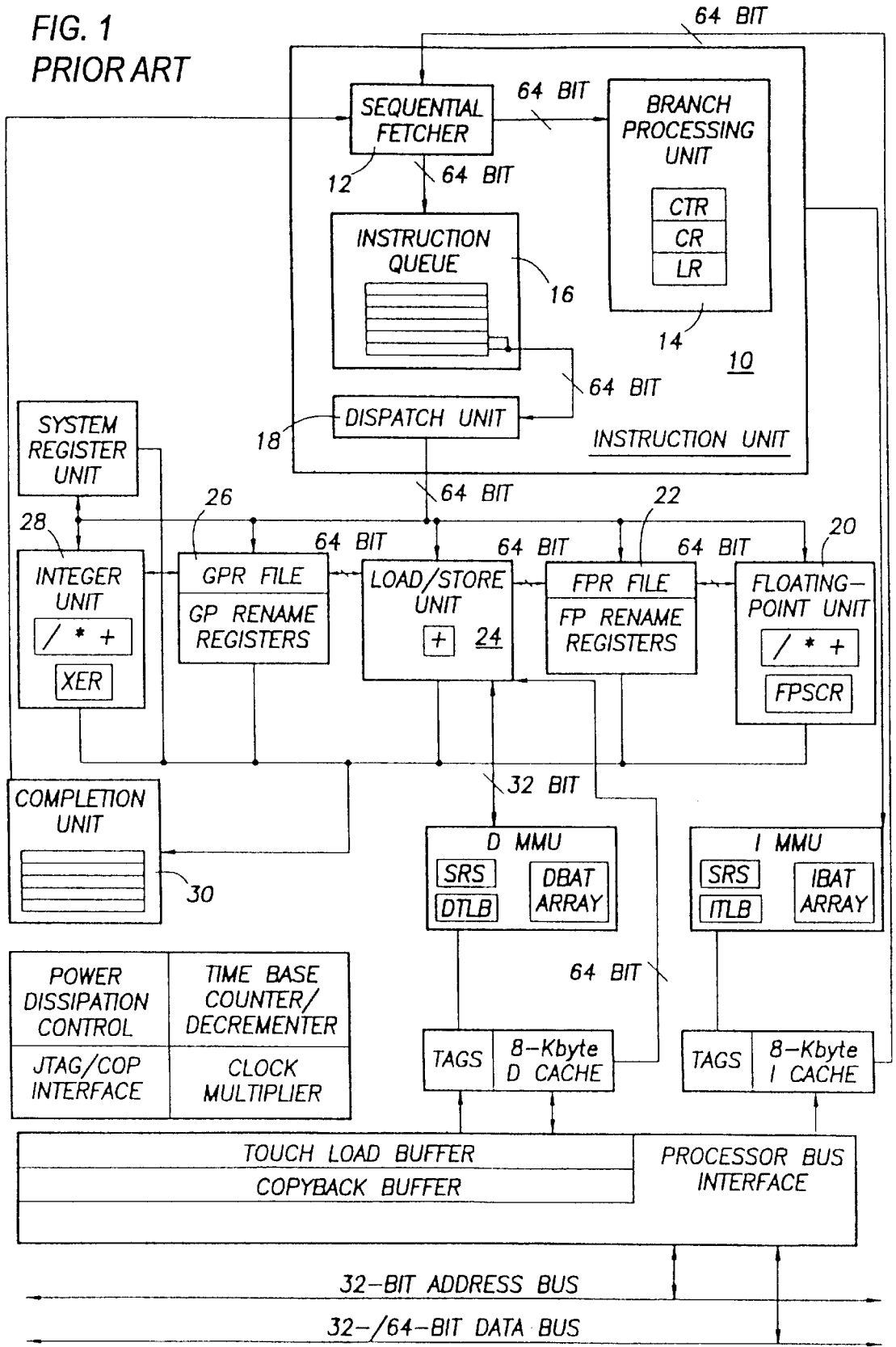
FIG. 1 is a block diagram of a microprocessor architecture used to illustrate embodiments of the invention.

Embodiments of the present invention will now be described with respect to an exemplary microprocessor architecture. FIG. 1 is a block diagram of the exemplary POWERPC 603 RISC microprocessor. As shown in the figure, the processor comprises an instruction unit 10 having a sequential fetcher 12, a branch processing unit 14 and an instruction queue 16. The instruction queue 16 queues up instructions for execution and provides them to dispatch unit 18 which, in turn, distributes the instruction data to the various execution units of the processor such as floating point unit 20, load/store unit 24 and integer unit 28. These execution units process the instruction data then provide the processed data to other resources on the chip such as the completion unit 30 and the register files 22 and 26. Detailed operation of the architecture shown in FIG. 1 is available in publications such as the "POWERPC 603 RISC Microprocessor Technical Summary," available from IBM Corporation, incorporated herein by reference. However, it is to be understood that the architecture shown in FIG. 1 is provided for illustration and numerous other suitable architectures will occur to those of skill in the art. Thus, detailed description of the processor's operation is unnecessary here, and, for present purposes, it is sufficient to point out that many of the data processing resources of the processor involve data flow units which sequentially process data in a number of consecutive steps. For example, to process a floating point instruction received from the dispatch unit 18, floating point unit 20 processes the data through four distinct stages. This is shown in FIG. 1A.

Figure 1A:
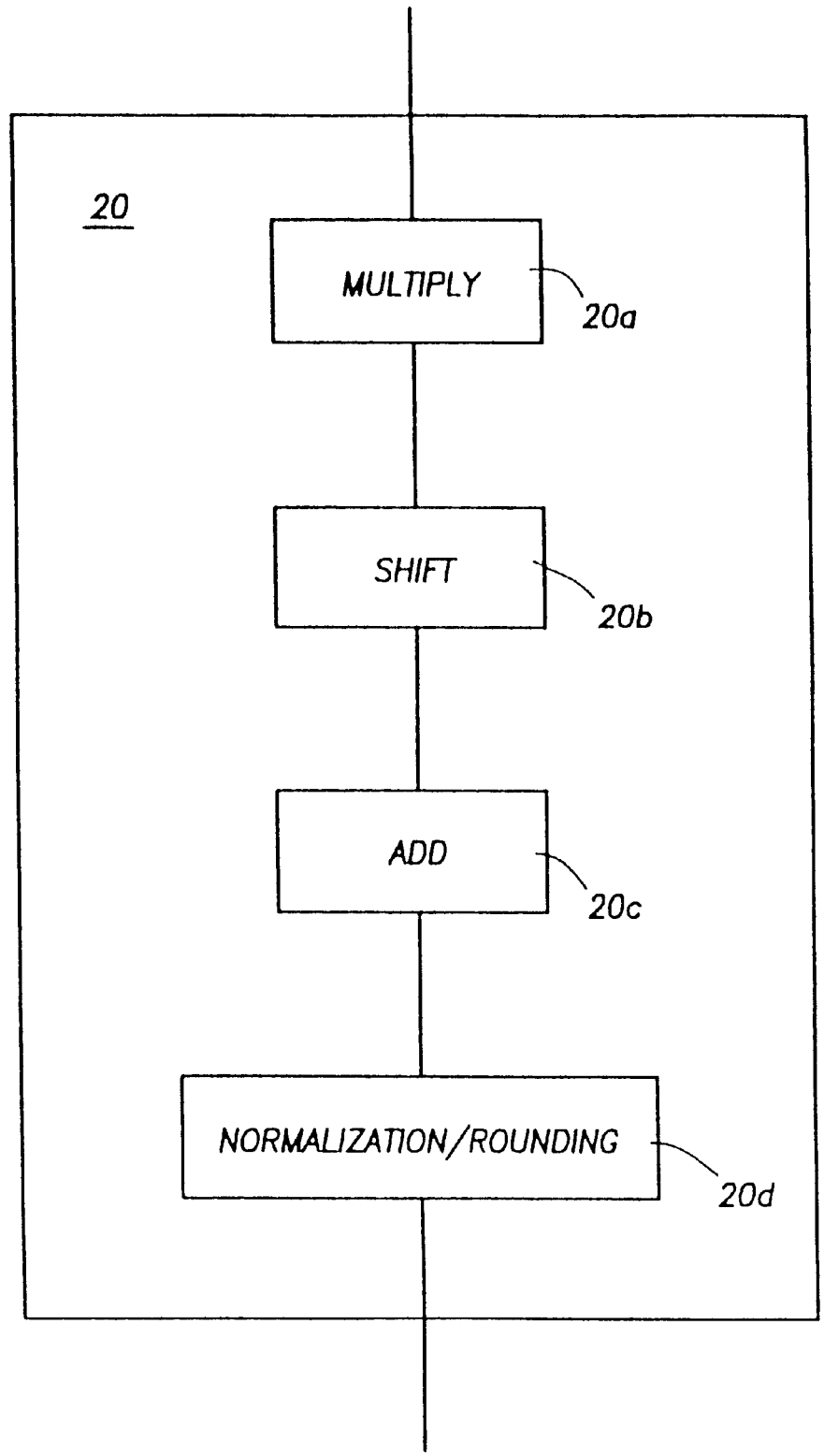
FIG. 1A is a block diagram of a conventional multiply-add functional unit.

FIG. 1A is a block diagram of floating point unit 20. The floating point unit comprises four distinct stages, i.e., multiply stage 20a, shift stage 20b, add stage 20c and normalization/rounding stage 20d. In order to maintain synchronization with the other resources which provide data to, and receive data from, floating point unit 20, the operation of each of these stages is controlled by the system clock of the microprocessor. Typically, each stage requires one clock cycle to perform its required processing of the data. Thus, in this example, floating point instruction data provided to instruction unit 20 would require four clock cycles for execution. Thus, the conventional floating point unit shown suffers from the inefficiencies discussed previously.

Figure 2:
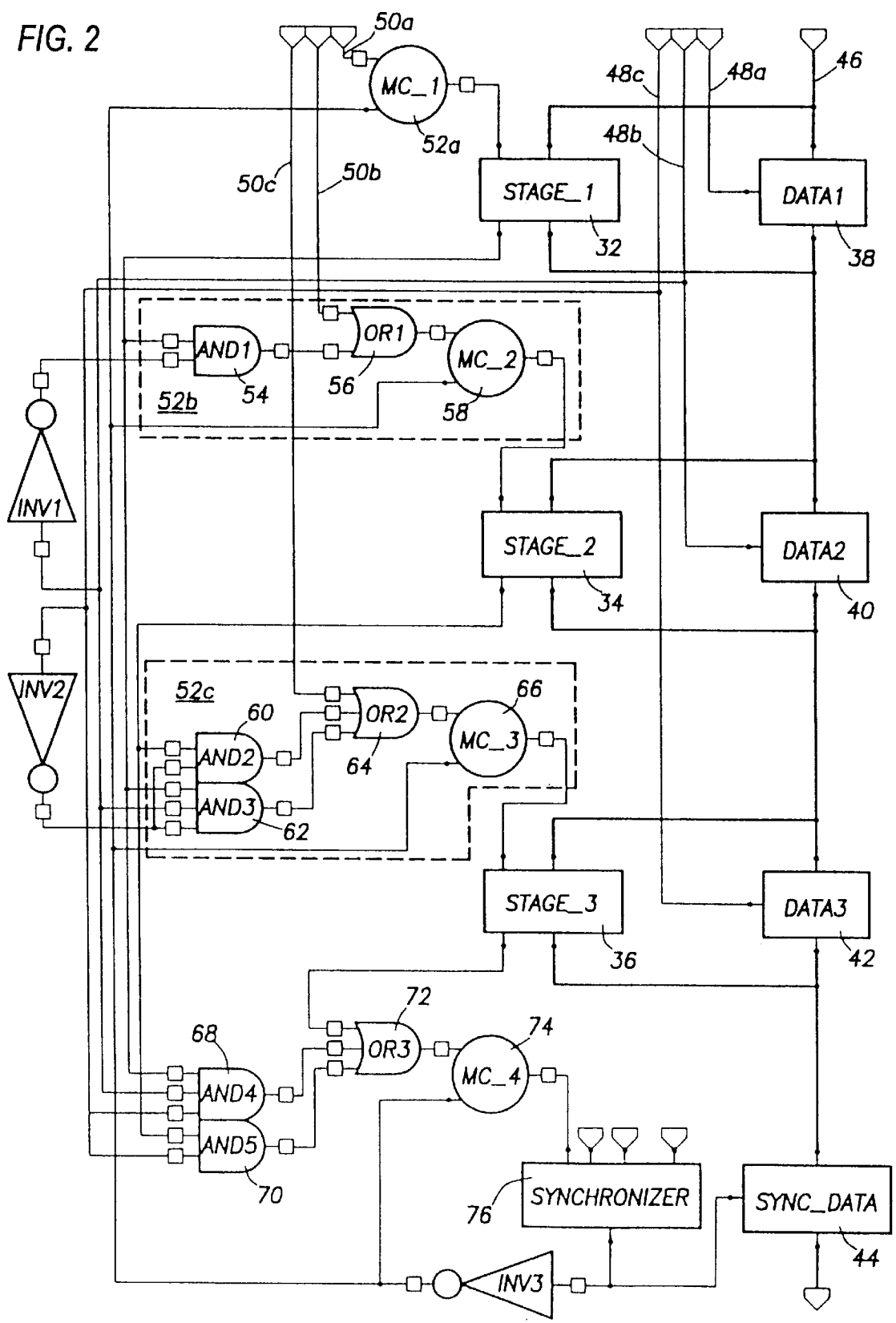
FIG. 2 is a schematic diagram of a data flow unit according to an embodiment of the invention.

Referring now to FIG. 2, an embodiment of the present invention is provided which allows both asynchronous flow of data through the unit, as well as the ability to select specific stages to process the data. This avoids the necessity for data to flow through a stage of the unit if no processing is required by that particular stage.

As seen in the figure, the data flow unit comprises stages, 32, 34 and 36 which will be referred to as stage 1, stage 2 and stage 3, respectively. Of course, it will be recognized that this is for purposes of illustration only, the number of stages is a matter of design choice. Each stage is coupled to data bus 46 so that data processed by one stage may be provided to any other stage located downstream on data bus 46.

Each stage also has an associated data transceiver 38, 40 and 42, respectively. The data transceivers are also coupled to data bus 46 and operate to allow data to bypass a particular stage in data bus 46. Specifically, each of transceivers 38, 40 and 42 are responsive to stage enable signals provided on signal lines 48a, 48b and 48c, respectively. In this particular embodiment, stage enable signals stage1_enb_n, stage2_enb_n and stage3_enb_n are asserted low. In other words, if stage1_enb_n is low, then transceiver 38 is off, and data on bus 46 flows through stage 1 for processing. Conversely, if stage1_enb_n is high, then transceiver 38 transmits data directly from data input, data_in, downstream to stages 2 or 3. Thus, in this case, the data would be unprocessed by stage 1.

Each of stages 1, 2 and 3 is provided with an input for receiving a request signal which informs the stage that it is to process data received at its inputs. In this illustration, the request signals are labeled request_stage1, request_stage2, and request_stage3, respectively. Each stage is also provided with an output for transmitting an acknowledge signal which informs the downstream stages and/or the synchronizer 76 that the stage asserting the acknowledge signal has completed its processing of the data. The acknowledge signals are denoted ackn_1, ackn_2, and ackn_3, respectively.

Figure 3:
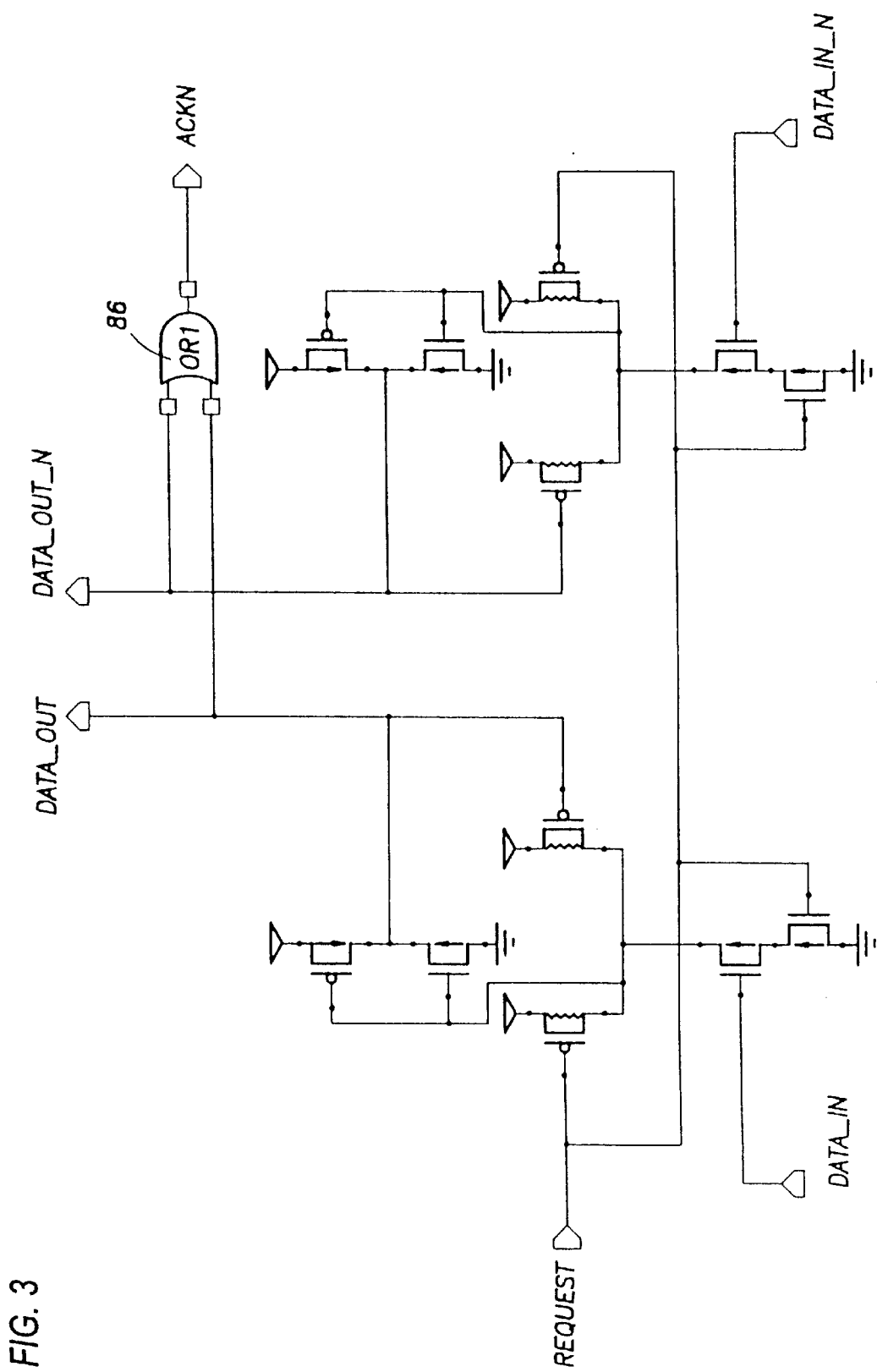
FIG. 3 is a schematic diagram of a stage useful in the circuit shown in FIG. 2, according to an embodiment of the invention.

The operation of the stages will be described in greater detail with respect to FIG. 3. FIG. 3 is a schematic diagram illustrating a data processing stage according to an embodiment of the invention. In this embodiment, the data processing stage receives complementary data input signals, data_in and data_in_n. The data processing stage also provides complimentary output signals data_out and data_out_n. Single rail versions are, of course, also possible if no acknowledge signal is required, or if the acknowledge logic is modified. The operation of the stage will be described with respect to the data_in rail.

When data to be processed is received at the inputs data_in, it is passed to processing logic which processes the data as required by the processing step associated with the stage. Although such processing logic can become quite complex depending on the design requirements, for purposes of illustration, a very simple processing logic comprising a single NMOS transistor QF3 gated by the data received at data_in is shown. Transistor QF3 operates to pull down output node I2 as will be described in greater detail herein.

For the purpose of illustration, only the data_in rail is described. During reset, the request signal is low. This causes NMOS transistor QF1 to be off, hence ensuring the pass to ground through QF3 is interrupted, and PMOS transistor QR9 to turn on and precharge node I2 high, in preparation for evaluating the data received at data_in. Transistors QF10 and QF12 comprise an inverter so that when node I2 is high, data_out is low. Because of sub-threshold and junction leakage currents, PMOS transistor QS12 has been added which also serves to keep node I2 charged high after reset has gone inactive. QS12 is sized small enough so that it will be "overdriven" when data_in causes transistor QF3 to turn on. With request being low, data_out is low, and, since data_out_n is also low, the output of OR gate 86, i.e. the acknowledge signal, is also low.

When the request signal goes high, transistors QR9 turns off and QF1 turns on and the stage is ready to evaluate the data at data_in. With the simplified processing logic shown, it is seen that if data_in is high, then a pull down path is created between node I2 and ground through transistors QF3 and QF1. This pulls node I2 low causing data_out to go high due to the inverter formed by QF10 and QF12. When data_out goes high, the acknowledge output of OR gate 86 also goes high. This indicates the stage has completed processing the data and the acknowledge signal is provided to subsequent stages. The operation of the data_in_n rail is substantially similar, but complimentary, to data rail data_in, and will not be further described here.

Referring again to FIG. 2, it is seen that each of stages 1, 2 and 3 is provided with request assertion logic 52a, 52b and 52c, respectively, for asserting the request signal. In this embodiment, there are, generally, two methods by which the request assertion logic can assert the request signal. First, an external request signal can be provided to a stage by external logic. External request signals are denoted request_1, request_2, and request_3 and are provided to the request assertion logic for stages 1, 2 and 3 on signal lines 50a, 50b and 50c, respectively. In this case, the external logic is responsible for determining which stages are required to process a particular block of data, and to assert the appropriate external request and stage enable signals. The second way for the assertion logic to assert the request signal is in response to an acknowledge signal from an upstream stage. Since there are no stages upstream of stage 1, the request signal for this stage can only be provided from external logic. Therefore, the operation of the assertion logic for both methods will be described in more detail with respect to stage 2.

Figure 4:
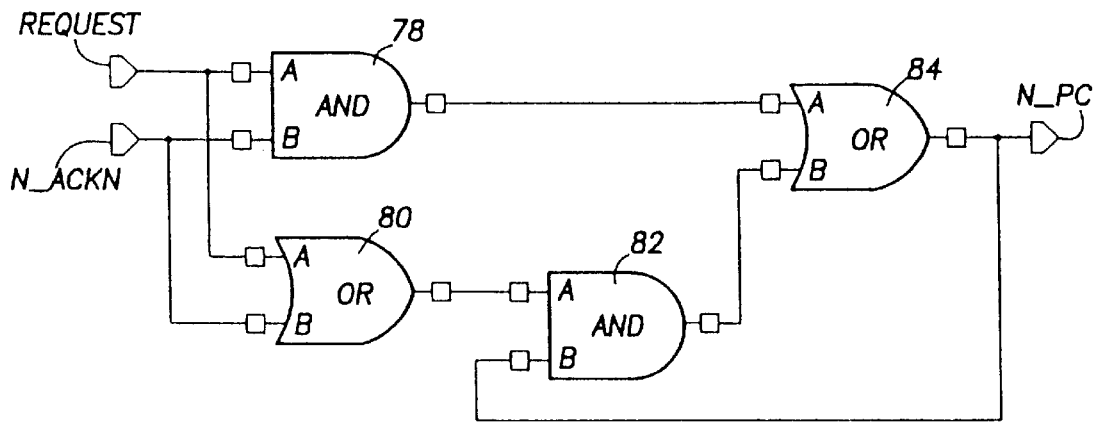
FIG. 4 is a schematic diagram of a Muller-C element.
Figure 5:
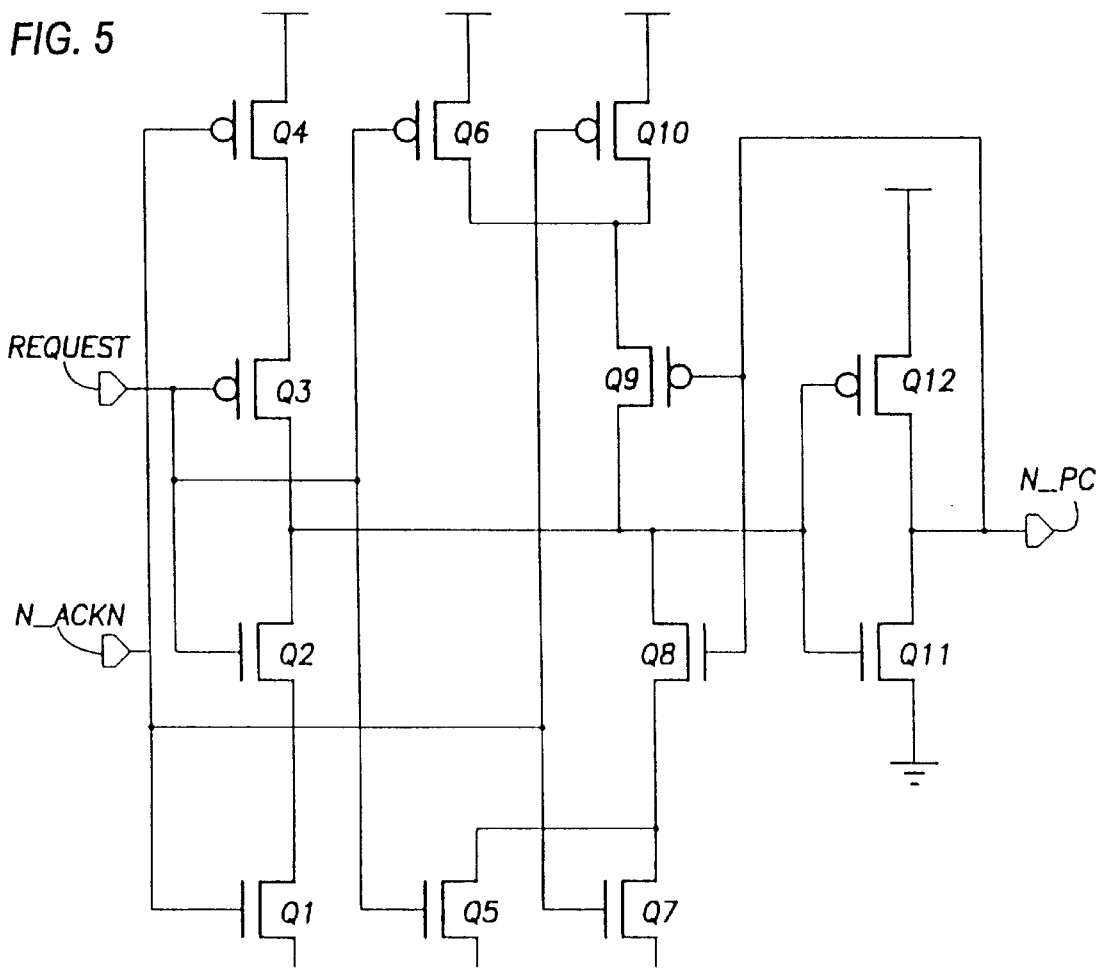
FIG. 5 is a schematic diagram of the circuit shown in FIG. 4 as implemented in static CMOS logic.

The request_stage 2 signal is driven by request logic 52b. In this case, request logic 52b comprises AND gate 54 OR gate 56 and Muller-C element 58. FIG. 4 is a schematic diagram of a Muller-C element useful in an embodiment of the invention. The Muller-C element comprises a pair of inputs for receiving signals request and n_ackn which are provided to AND gate 78 and OR gate 80. The output of these logic gates is then provided to AND gate 82 and OR gate 84. The output of the Muller-C element is taken at the output of OR gate 84 and is denoted n_pc. In operation, when both inputs to the Muller-C element are at the same state (i.e., high or low), then this state is output at n_pc. Whenever the inputs are at different states, then the output n_pc retains its previous state. FIG. 5 is a schematic diagram of the circuit shown in FIG. 4 as implemented in static CMOS logic.

If external logic drives request_2 high, then the output of OR gate 56 goes high and Muller-C element 58, in turn, drives the request input to stage 2 high. This method of operation is useful when it is desired to bypass stage 1 and provide data from input data_in directly to stage 2 for processing. In this case, stage 1_enb_n is asserted high, turning on transceiver 38 which passes data directly to stage 2. In this way, stage 2 is selected as the initial stage to begin processing the data that is provided to the data flow unit.

Naturally, if processing by stage 1 is desired, then external logic will raise request_1 to assert request_stage 1 of stage 1 via assertion logic 52a which, in this case, comprises only a Muller-C element. Stage1_enb_n will be set low to disable transceiver 38. In this case, the second method is used. Here, the request input for stage 2 cannot be asserted until stage 1 provides an acknowledge signal, ackn_1, indicating that it has completed processing of the data. This handshaking between stages is necessary because of the asynchronous nature of the data flow unit.

When stage 1 completes processing, it asserts ackn_1 high. This acknowledge signal is provided to one input of AND gate 54. The other input to AND gate 54 is the compliment of stage2_enb_n. If processing by stage 2 is desired, then stage2_enb_n is low and transceiver 40 is disabled. The stage2_enb_n signal is inverted and provided to the other input of AND gate 54. This causes the output of AND gate 54 to go high. This signal then ripples through OR gate 56 and Muller-C element 58 to assert the request line of stage 2 causing it to process the data provided by stage 1.

Similarly, stage 2 provides acknowledge signal, ackn_2, to stage 3. It is to be noted that the request assertion logic 52c of stage 36 is somewhat more complicated than that of assertion logic 52b. This is because stage 3 must be able to receive data from either stage 1 or stage 2. Specifically, assertion logic 52c comprises AND gates 60 and 62, OR gate 64 and Muller-C element 66. Of course, the request line for stage 3, request_stage 3, can be asserted by external logic asserting request_3, or an acknowledge from either stage 1, or stage 2.

From the above description, it is seen that the data flow unit allows data processing to be performed by any combination of the data processing stages. For example, by asserting a signal high at request_1, stage2_enb_n and stage3_enb_n, processing by stage 1 only will be performed. Stages 2 and 3 will be bypassed by transceivers 40 and 42. By asserting request_2 and stage1_enb_n, stage 1 will be bypassed, and initial processing will be performed by stage 2 and, subsequently, by stage 3. Thus, it is seen that by asserting the appropriate combination of external request lines and stage enable lines, it is possible to process data with any one of the stages, any two of the stages, or all three of the stages.

It will be understood that the processing performed by the data flow unit illustrated in the embodiment shown in FIG. 2, is performed asynchronously. This allows for rapid processing of data, but the processed data must be synchronized with system bus clock before it can be made available to other resources of the processor. This synchronization is performed by synchronizer 76.

Figure 6:
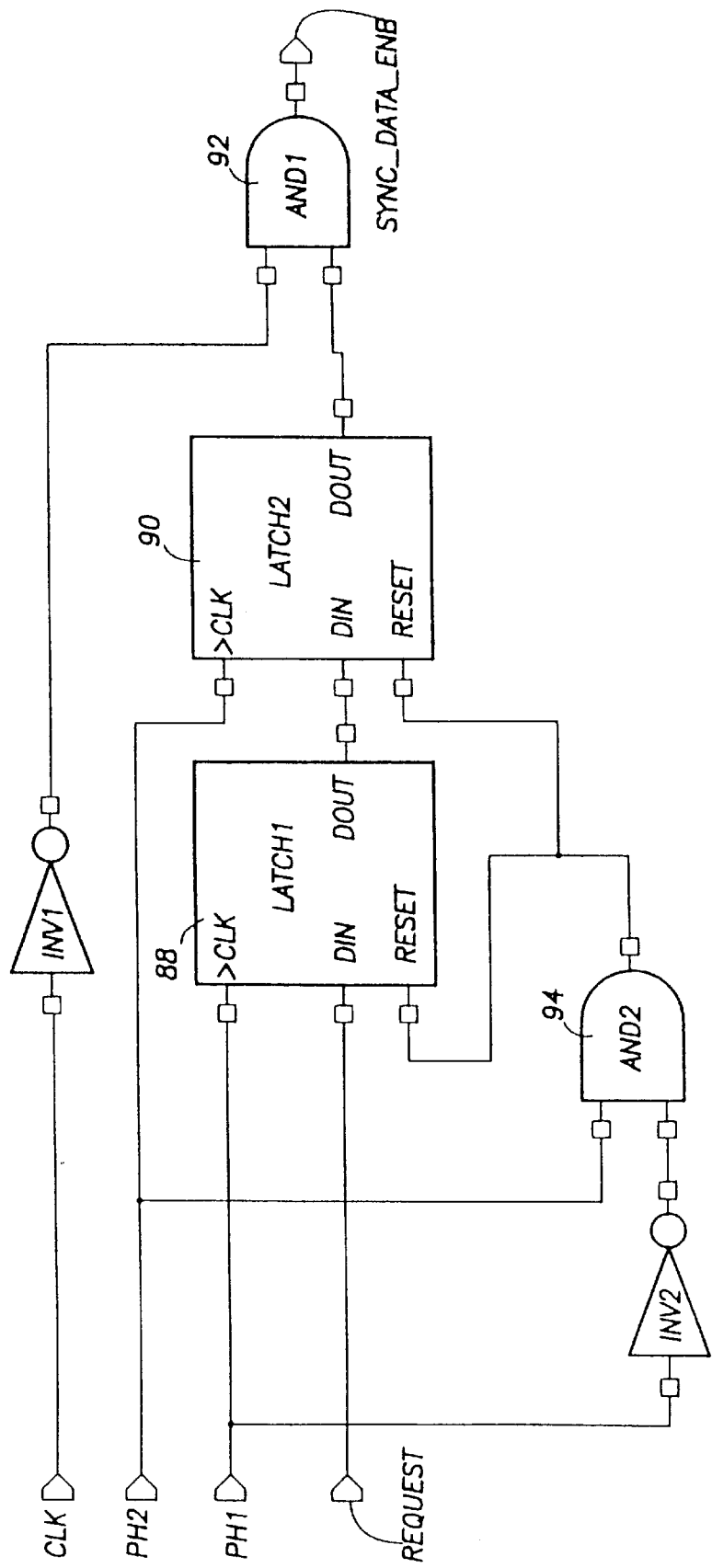
FIG. 6 is a schematic diagram of a synchronizer according to an embodiment of the invention.

FIG. 6 shows a schematic diagram of a synchronizer according to one embodiment of the invention. In this case, the system clock CLK has been divided into two distinct phases, clock_phase_1 ("ph1") and clock_phase_2 ("ph2"). The phase relationship is shown in greater detail in the timing diagram of FIG. 7 which will be discussed more fully herein. The synchronizer comprises a pair of latches 88, 90 which are clocked by ph1 and ph2, respectively. The input request to latch 88 is driven by the signal request_sync. Request_sync is generated by the logic block comprising AND gates 68, 70 which are coupled to OR gate 72 and Muller-C element 74. The operation of this logic block is substantially similar to the request assertion logic used for stage 3, and will not be described further here, except to note there is no need for an external request signal since at least one of the stages will perform processing of the data.

When ph1 goes high, request_sync forces the input to latch 90 to go high, which, in turn, activates one input of AND gate 92 when ph2 goes high. To ensure that the output of AND gate 92, sync_data_enb, goes high only during the second half of the cycle, CLK is inverted and ANDed with the output of latch 90. This has the additional benefit of inactivating sync_data_enb at the end of the clock cycle. Sync_data_enb now activates transceiver 44 which passes the processed data on signal line 46 to other external, usually synchronous, system resources.

The inversion of sync_data_enb, sync_ackn_n, goes high and is provided to the request assertion logic 52a, 52b and 52c of each of the stages. This signal serves as an acknowledge to the previous stages, resetting the stages and preparing them to receive another block of data.

The operation of the data flow unit shown in FIG. 2 will now be described in greater detail with respect to the timing diagram shown in FIG. 7. In this example, the timing diagram shows a clock cycle where stage 1 drives stage 2 and stage 2 drives the synchronizer. Stage 3 is not active.

In this case, stage 1 serves as the initial stage, i.e., it is the first stage to process data from data line 46, and it receives an external request signal request_1 from external logic. Request 1 is provided to the request input of Muller-C element 52a after some circuit delay referenced to CLK and data_in becomes available. The n_ackn input of Muller-C element 52a is high at this time, and therefore, request_stage1 goes high, enabling stage 1. Transceiver 38 is disabled by stage1_enb_n, and therefore, data goes to stage 1 for processing. As stage 1 completes its evaluation, it provides output data, data_1, onto data path 46. After a delay of approximately 0.1 nanoseconds from providing data_1, stage 1 drives its acknowledge signal ackn_1 high.

Since stage 2 is not the initial stage, but is selected to process data, request_2 is low, and stage2_enb_n is low. Thus, transceiver 40 is disabled, and when ackn_1 is driven high, the output of the assertion logic 52b, request_stage 2, is driven high 0.1 nanoseconds later, thus causing stage 2 to process data_1. When stage 2 completes the processing, it provides output data_2 to data path 46. After a brief delay, it drives ackn_2 high.

Since stage 3 has not been selected to process data 2, stage3_enable_n is high, enabling transceiver 42. Request_stage 3 remains low. Thus, data 2 is passed through transceiver 42 to transceiver 44.

The data at transceiver 44, will now be output to external resources on the chip after being synchronized with the system clock. To achieve this, it is seen that the acknowledge ackn_2 from stage 2 causes request_sync to go high. Clock_phase_1 (ph1) goes high operating latch 88 as described previously. Clock_phase_2 (ph2) then goes high a short time after clock_phase_1 driving latch 90. When clock signal CLK then goes low, sync_data_enb then goes high causing transceiver 44 to output the data on data path 46 to external logic and synchronization with the clock. Simultaneously, the inverted signal sync_ackn_n is provided to Muller-C elements 52a, 58 and 56, thereby resetting the stages so that the data flow unit is reset and ready to receive another block of data for processing. More specifically, before a new request signal is received, both latches 88, 90 must be reset, otherwise synch_out_enb would go active again as soon as clk_n goes low. ANDing the inversion of ph1 with the true of ph2 generates a short pulse and the latches are reset early in the clock cycle.

While the present invention has been described with respect to the above embodiments, it will be understood by those of skill in the art that minor changes in form and design may be made without departing from the scope and spirit of the present invention. All patents, patent applications, and other publications referenced herein are hereby incorporation by reference as though set forth in full.

What is claimed is:

1. A processor having a data flow unit for processing data in a plurality of steps, the data flow unit comprising:

a plurality of stages, each stage including logic for performing a data processing step and also including an acknowledgment arrangement for providing an acknowledge signal when the respective stage has performed the respective data processing step, the stages being coupled together by a data path extending from a data input point to a data output point;

at least one stage which data may bypass without being processed, each stage which data may bypass having a stage selection arrangement coupled thereto, the stage selection arrangement for the respective stage being connected to receive an acknowledge signal from a preceding stage and a stage enable signal, and being adapted to produce a request signal for the respective stage, the request signal enabling the respective stage to process data applied thereto along the data path;

each stage which data may bypass also including a data bypass path connected in parallel with the respective stage;

the stage selection arrangement for each respective stage further including a transceiver coupled in the respective data bypass path, the transceiver being responsive to the stage enable signal for the respective stage to enable data to bypass the respective stage; and a synchronizer coupled in the data path at the data output point, the synchronizer causing data processed by the data flow unit to be provided to external logic in synchronization with a clock signal.

2. A processor as in claim 1 further comprising logic for asserting the request signal, the logic being responsive to the acknowledge signal, the stage enable signal, and an external request signal from external logic.

3. A processor as in claim 2 wherein the logic for asserting the request signal comprises a circuit having an output which is asserted when the external request signal is asserted or when the stage enable signal and the acknowledge signal are asserted.

4. A processor as in claim 3 wherein the logic for asserting the request signal further comprises a Muller C element.

5. A processor as in claim 1 wherein the synchronizer comprises logic for latching a first phase of the clock signal and providing a synchronization signal responsive to a second phase of the clock signal.

6. A data flow unit useful in processing data in a microprocessor, the processing being performed in a plurality of steps and the individual steps being performed by stages of the data flow unit, the data flow unit comprising:

means for providing data to be processed to an initial stage of the data flow unit;

means for providing a request signal to the initial stage of the data flow unit;

means for selecting individual stages to process the data;

means for, after the selected individual stages have processed the data, passing the processed data to a synchronizer which synchronizes the processed data with a clock signal; and wherein the means for selecting individual stages includes a plurality of transceivers, one transceiver coupled to each individual stage, each transceiver having logic which enables input data to the respective stage to bypass said stage responsive to a stage enable signal.

7. A data flow unit as in claim 6 wherein the means for providing data to be processed to an initial stage comprises:

a data input coupled to logic in the initial stage which processes data received at the data input, the logic in the initial stage comprising pull-down logic for pulling an output node low responsive to the data received at the data input.

8. A data flow unit as in claim 7 wherein the means for providing a request signal to the initial stage of the data flow unit comprises pull up logic for pulling the output node high.

9. A method for processing data in a data flow unit having a plurality of stages, each stage including logic for performing a data processing step, the method comprising the steps of:

providing a stage enable signal to a bypass transceiver associated with a selected stage of the data flow unit;

providing a request signal to the selected stage of the data flow unit;

providing data to the selected stage of the data flow unit;

performing a data processing step on the data at the selected stage of the data flow unit;

producing an acknowledge signal at the selected stage when said stage has performed the respective data processing step;

outputting the resulting processed data from the selected stage of the data flow unit;

in response to the acknowledge signal and a stage enable signal to request logic associated with a following stage of the data flow unit, performing an additional data processing step on the processed data output by the selected stage;

providing data processed by the data flow unit to external logic, said data being provided in synchronization with a clock signal.

10. The method of claim 9 wherein the plurality of stages are coupled together in a data path and further comprising the step of causing data to bypass at least one stage in the data path.

11. The method of claim 10 wherein the step of causing data to bypass at least one stage includes the step of enabling a transceiver associated with said stage to pass data along a bypass path connected in the data path in parallel with said stage.

12. The method of claim 9 wherein providing data processed by the data flow unit to external logic includes the steps of latching a first phase of the clock signal and providing a synchronization signal responsive to a second phase of the clock signal.

* * * * *